United States Patent
Agrawal et al.

(10) Patent No.: US 12,323,778 B2
(45) Date of Patent: Jun. 3, 2025

(54) VIOLATION DETECTION FOR UNMANNED AERIAL VEHICLES

(71) Applicant: THE BOEING COMPANY, Arlington, VA (US)

(72) Inventors: Rajat Agrawal, Denver, CO (US); Athanasios Apostolopoulos, Highlands Ranch, CO (US)

(73) Assignee: THE BOEING COMPANY, Arlington, VA (US)

( * ) Notice: Subject to any disclaimer, the term of this patent is extended or adjusted under 35 U.S.C. 154(b) by 190 days.

(21) Appl. No.: 18/153,474

(22) Filed: Jan. 12, 2023

(65) Prior Publication Data
US 2024/0244369 A1    Jul. 18, 2024

(51) Int. Cl.
| H04R 3/00 | (2006.01) |
| G06Q 50/26 | (2024.01) |
| H04N 7/18 | (2006.01) |
| H04R 1/40 | (2006.01) |

(52) U.S. Cl.
CPC .............. *H04R 3/005* (2013.01); *G06Q 50/26* (2013.01); *H04N 7/188* (2013.01); *H04R 1/406* (2013.01)

(58) Field of Classification Search
CPC ........ H04R 3/005; H04R 1/406; G06Q 50/26; H04N 7/188
USPC .......................................................... 381/56
See application file for complete search history.

(56) References Cited

U.S. PATENT DOCUMENTS

| 10,032,464 | B2 | | 7/2018 | Franklin et al. |
| 11,579,302 | B2 | * | 2/2023 | Turov .................. G06V 20/64 |
| 12,057,023 | B1 | * | 8/2024 | Cleckler ................ G08G 5/26 |
| 12,135,382 | B2 | * | 11/2024 | Meyer .................. H04B 1/0057 |
| 2018/0129881 | A1 | * | 5/2018 | Seeber .................. G08G 5/22 |
| 2020/0045416 | A1 | * | 2/2020 | Kamio .................. G01H 3/125 |
| 2020/0299002 | A1 | * | 9/2020 | Nielsen ............. G05B 23/0286 |
| 2022/0343773 | A1 | * | 10/2022 | Ali .......................... G08G 5/30 |

FOREIGN PATENT DOCUMENTS

| CN | 115902786 | A | * | 4/2023 |
| JP | 6865371 | B2 | * | 4/2021 |
| TR | 2022004071 | A2 | * | 9/2023 |

OTHER PUBLICATIONS

FAA, "Noise Certification Standards: Matternet Model M2 Aircraft", Sep. 12, 2022.*

* cited by examiner

Primary Examiner — David L Ton
(74) Attorney, Agent, or Firm — Moore IP Law

(57) ABSTRACT

An automated environment for violation detection for unmanned aerial vehicles includes obtaining an identification associated with an unmanned aerial vehicle, analyzing a sound received by a microphone, and determining if the sound is associated with the unmanned aerial vehicle. Responsive to determining the sound is associated with the unmanned aerial vehicle, the automated environment for violation detection for unmanned aerial vehicles also includes capturing data associated with a location of the unmanned aerial vehicle, and determining if the unmanned aerial vehicle is committing a violation.

20 Claims, 3 Drawing Sheets

VIOLATION DETECTION FOR UNMANNED AERIAL VEHICLES

FIELD OF THE DISCLOSURE

The subject disclosure is generally related to violation detection for unmanned aerial vehicles.

BACKGROUND

Use of unmanned aerial vehicles is becoming more commonplace. Determining, tracking, and holding responsible violators associated with misuse of unmanned aerial vehicles can be difficult. As unmanned aerial vehicles continue to proliferate due to their wide range of uses (e.g., transporting humans and cargo, surveillance and first response missions, photography, etc.), some barriers to societal acceptance of the use of unmanned aerial vehicles exist. Barriers to societal acceptance of the use of unmanned aerial vehicles include privacy concerns associated with unwanted surveillance, concerns about pollution generated by drones that utilize combustion engines, and concerns about an amount of noise unmanned aerial vehicles will generate during operation.

Governmental entities associated with flight may establish rules associated with areas where unmanned aerial vehicles can and cannot be operated. The governmental entities may provide data that defines restricted areas (e.g., no fly zones) where unauthorized unmanned aerial vehicles cannot fly. Such areas may be associated with military bases and military property, national parks, airports, prisons, hospitals, schools, manufacturing facilities, etc. Temporary restricted areas may be defined based on disasters, accidents, public events, etc. In addition, such governmental entities may require unmanned aerial vehicles to include a transmitter that broadcasts identification information of the unmanned aerial vehicle or may require a controller associated with a small, unmanned aerial vehicle to broadcast identification information.

As more and more unmanned aerial vehicles are used to perform tasks, residents and establishments will want to control aspects of what is and what is not acceptable when unmanned aerial vehicles fly into, over, or in proximity to particular locations. For example, property owners would like there to be a noise limit for unmanned aerial vehicles, would like to limit the ability of unmanned aerial vehicles to take images, and would like to control times of use of unmanned aerial vehicles.

SUMMARY

In a particular implementation, a method includes a microphone, a memory configured to store instructions, and one or more processors coupled to the microphone and couped to the memory. The one or more processors are configured to obtain an identification associated with an unmanned aerial vehicle, analyze a sound received by the microphone, and determine if the sound is associated with the unmanned aerial vehicle. The one or more processors are also configured to, responsive to determining the sound is associated with the unmanned aerial vehicle, capture data associated with a location of the unmanned aerial vehicle. The one or more processors are also configured to determine if the unmanned aerial vehicle is committing a violation.

In another particular implementation, a non-transient, computer-readable medium stores instructions that, when executed by one or more processors, cause the one or more processors to initiate, perform, or control operations including obtaining an identification associated with an unmanned aerial vehicle, analyzing a sound received by a microphone, and determining if the sound is associated with the unmanned aerial vehicle. The operations also include, responsive to determining the sound is associated with the unmanned aerial vehicle, capturing data associated with a location of the unmanned aerial vehicle. The operations also include determining if the unmanned aerial vehicle is committing a violation.

In another particular implementation, a device includes means for receiving a sound. The device also includes means for obtaining an identification associated with an unmanned aerial vehicle. The device also includes means for analyzing the sound. The device also includes means for determining if the sound is associated with the unmanned aerial vehicle. The device also includes means for, responsive to determining the sound is associated with the unmanned aerial vehicle, capturing data associated with a location of the unmanned aerial vehicle. The device also includes means for determining if the unmanned aerial vehicle is committing a violation.

In another particular implementation, a method includes receiving a sound. The method also includes obtaining an identification associated with an unmanned aerial vehicle. The method also includes analyzing the sound. The method also includes determining if the sound is associated with the unmanned aerial vehicle. The method also includes, responsive to determining the sound is associated with the unmanned aerial vehicle, capturing data associated with a location of the unmanned aerial vehicle. The method also includes determining if the unmanned aerial vehicle is committing a violation.

The features, functions, and advantages described herein can be achieved independently in various implementations or can be combined in yet other implementations, further details of which can be found with reference to the following description and drawings.

DETAILED DESCRIPTION

Figure 1:
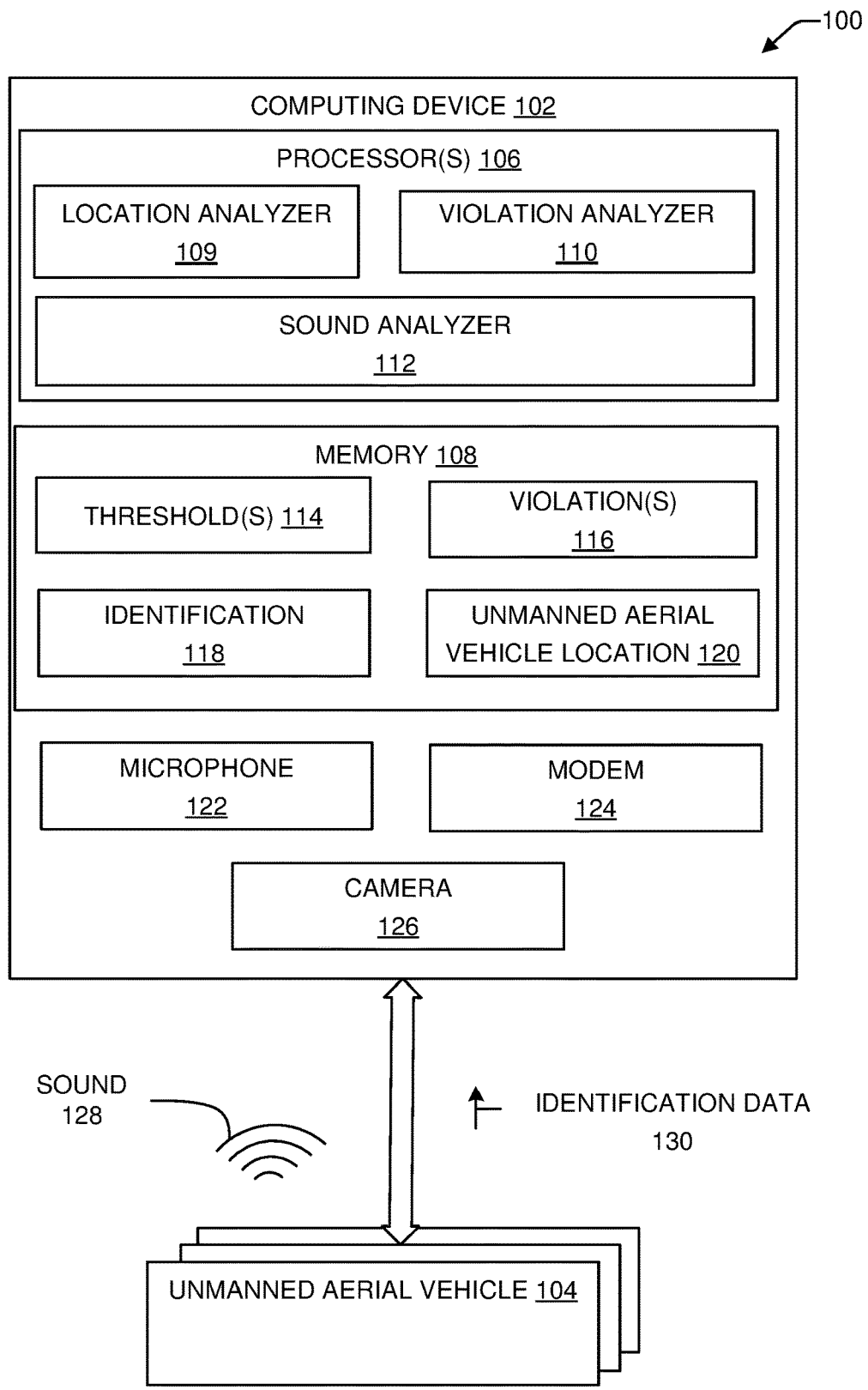
FIG. 1 depicts an example system for violation detection for unmanned aerial vehicles, in accordance with at least one implementation of the subject disclosure.

Having a large number of unmanned aerial vehicles ("UAV" or "UAVs") flying relatively close to the ground, particularly in residential areas, can generate a lot of noise, particularly by UAVs operating in areas in which they do not belong. Tracking the party responsible party for noise pollution and/or location violations can improve the quality of life of people living in high-UAV use areas and aid societal acceptance of UAVs use, allowing for further improvements in the UAVs themselves by encouraging further adoption of UAVs and increased demand for innovation.

In accordance with at least one implementation of the subject disclosure, a UAV monitor device may be used at a property. The UAV monitor device may monitor noise produced by UAVs using one or more microphones coupled to the UAV monitor device as noise detectors. In addition, the UAV monitor device can broadcast restrictions associated with the property. Although such restrictions may be ignored unless the property is associated with a governmentally defined no-fly zone, disregarding such restrictions may result in negative consequences for an entity associated with violation of the restrictions. For example, if a particular UAV operator often violates rules for a low altitude air space, an owner associated with the low altitude air space may choose to utilize a different UAV operator, which may result in a loss in revenue for the particular UAV operator.

In accordance with at least one implementation of the subject disclosure, determining the parties responsible for exceeding noise levels over and around residences and establishments can include the use of noise level detectors and UAV identifiers unique to the particular UAV and/or the party responsible for the particular UAV. In a particular aspect, the noise level sensors can be installed to monitor an area and to track which UAV operator is responsible for the noise. When a UAV creates noise at levels that exceed the levels set by certain entities (e.g., cities, municipalities, property owners), the information from the noise level sensors and the unique identifiers, can be provided to appropriate authorities so that a violator can be held responsible for inappropriate UAV behavior. For example, city governments can issue fines for noise ordinance violations to UAV operators. As an additional example, an entity associated with use of a UAV can modify a fee associated with use of the UAV for residences and/or commercial establishments that are willing to accept a higher-than-expected noise level.

An advantage of the subject disclosure is that a person with authority over particular property can establish rules (e.g., times of entry, noise limits, other limits, or combinations thereof) associated with use of a near ground air space associated with the particular property. Violation(s) of the rules can be tracked and may be reported to authorities if the violations violate one or more governmental regulations or the violations may be used as a basis to determine who can provide services to the particular property. Improvements to the UAV itself can be used to implement the noise and/or location violation tracking measures described above. For example, a hardware improvement to the UAV can allow publishing, transmitting, and broadcasting of rules governing noise and/or location. One technical benefit of the subject disclosure is that hardware implementations for monitoring devices can avoid complete reliability on internet availability.

The figures and the following description illustrate specific exemplary embodiments. It will be appreciated that those skilled in the art will be able to devise various arrangements that, although not explicitly described or shown herein, embody the principles described herein and are included within the scope of the claims that follow this description. Furthermore, any examples described herein are intended to aid in understanding the principles of the disclosure and are to be construed as being without limitation. As a result, this disclosure is not limited to the specific embodiments or examples described below, but by the claims and their equivalents.

Particular implementations are described herein with reference to the drawings. In the description, common features are designated by common reference numbers throughout the drawings. As used herein, various terminology is used for the purpose of describing particular implementations only and is not intended to be limiting. For example, the singular forms "a," "an," and "the" are intended to include the plural forms as well, unless the context clearly indicates otherwise. Further, some features described herein are singular in some implementations and plural in other implementations. To illustrate, FIG. 1 depicts a system 100 including one or more processors ("processor(s)" 106 in FIG. 1), which indicates that in some implementations the system 100 includes a single processor 106 and in other implementations the system 100 includes multiple processors 106. For ease of reference herein, such features are generally introduced as "one or more" features and are subsequently referred to in the singular unless aspects related to multiple of the features are being described.

The terms "comprise," "comprises," and "comprising" are used interchangeably with "include," "includes," or "including." Additionally, the term "wherein" is used interchangeably with the term "where." As used herein, "exemplary" indicates an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to a grouping of one or more elements, and the term "plurality" refers to multiple elements.

As used herein, "generating," "calculating," "using," "selecting," "accessing," and "determining" are interchangeable unless context indicates otherwise. For example, "generating," "calculating," or "determining" a parameter (or a signal) can refer to actively generating, calculating, or determining the parameter (or the signal) or can refer to using, selecting, or accessing the parameter (or signal) that is already generated, such as by another component or device. As used herein, "coupled" can include "communicatively coupled," "electrically coupled," or "physically coupled," and can also (or alternatively) include any combinations thereof. Two devices (or components) can be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled can be included in the same device or in different devices and can be connected via electronics, one or more connectors, or inductive coupling, as illustrative, non-limiting examples. In some implementations, two devices (or components) that are communicatively coupled, such as in electrical communication, can send and receive electrical signals (digital signals or analog signals) directly or indirectly, such as via one or more wires, buses, networks, etc. As used herein, "directly coupled" is used to describe two devices that are coupled (e.g., communicatively coupled, electrically coupled, or physically coupled) without intervening components.

FIG. 1 depicts an example system 100 for violation detection of unmanned aerial vehicles, in accordance with at least one implementation of the subject disclosure. In some implementations, the system 100 includes a computing device 102 configured to communicate with one or more unmanned aerial vehicles 104.

In some implementations, sound 128 generated by unmanned aerial vehicle(s) 104 is received by a microphone 122 of the computing device 102. The sound 128 can include sound generated by the unmanned aerial vehicle(s) 104 in the course of operation (e.g., engine noise, rotor noise, etc.), sound delivered via a speaker of the unmanned aerial vehicle(s) 104 (e.g., broadcast messages, prerecorded messages, etc.), other sounds associated with the unmanned aerial vehicle(s) 104 (e.g., noise generated by a cargo of the unmanned aerial vehicle(s) 104, etc.), or some combination thereof. In some implementations, the microphone 122 can include one or more microphones coupled to the processor(s) 106. In some implementations, the one or more microphones are coupled to structure associated with a property (e.g., building(s), pole(s), tree(s), etc.) to monitor a low altitude (e.g., near ground) air space above the property. In other implementations, the microphone 122 can include a microphone installed on the interior or exterior of the unmanned aerial vehicle(s) 104. As an example, the microphone 122 can include a microphone array installed on the interior and/or exterior of the unmanned aerial vehicle(s) 104.

In some implementations, the unmanned aerial vehicle(s) 104 can also be configured to communicate identification data 130 to the computing device 102. Many governmental entities associated with UAVs 104 require UAVs 104 over a certain size to include a transmitter that broadcasts the identification data 130 and require controllers associated with UAVs 104 at or under the certain size to broadcast the identification data 130. The identification data 130 can include data uniquely identifying the unmanned aerial vehicle 104, one or more operators of the unmanned aerial vehicle 104, one or more parties responsible for the operation of the unmanned aerial vehicle 104, one or more parties otherwise responsible for the unmanned aerial vehicle 104, or some combination thereof. The identification data 130 can be communicated to the computing device 102 in an encrypted format, an unencrypted format, or some combination thereof. In some aspects, the unmanned aerial vehicle 104 can include an antenna configured to communicate the identification data 130 to the computing device 102. In a particular aspect, the unmanned aerial vehicle 104 can be configured to communicate the identification data 130 to the computing device 102 via a radio frequency, infrared frequency, other wireless frequency, or some combination thereof. In the same or alternative particular aspects, the identification data 130 can be associated with an automatic dependent surveillance-broadcast signal. In the same or alternative particular aspects, the identification data 130 can be associated with an internet-based identification.

In some implementations, the computing device 102 can include a microphone 122 operable to receive some or all of the sound 128 from the unmanned aerial vehicle(s) 104. In the same or alternative implementations, the computing device 102 can also include one or more processors 106 coupled to a memory 108 and the microphone 122. The processor(s) 106 are configured to obtain an identification 118 associated with an unmanned aerial vehicle 104. In some aspects, the identification 118 can be stored at the memory 108. The identification 118 can be based on the identification data 130 received from the unmanned aerial vehicle(s) 104 via a modem 124. For example, the unmanned aerial vehicle(s) 104 can be configured to communicate an encrypted signal to the computing device 102 as part of the identification data 130. The computing device 102 can be configured to decrypt some or all of the identification data 130 to determine the identification 118 for storage at the memory 108. As an additional example, the unmanned aerial vehicle(s) 104 can be configured to generate an automatic dependent surveillance broadcast signal, which can be received at the computing device 102 via the modem 124 when the unmanned aerial vehicle(s) 104 are within an appropriate distance of the computing device 102. The computing device 102 can be configured to parse the broadcast signal to determine the identification 118 for storage at the memory 108. As a further example, the unmanned aerial vehicle(s) 104 can communicate the identification data 130 to the computing device 102, wherein the identification data 130 includes an identifier of the unmanned aerial vehicle(s) 104. The computing device 102, in receipt of this identification data 130, can be configured to perform an internet-based operation to identify one or more entities responsible for the operation and/or control of the particular unmanned aerial vehicle 104.

In some implementations, the modem 124 is configured to broadcast via one or more transmitters a rules signal associated with the property. The rules signal may include information that defines a geographical area where the rules apply. The rules may include noise limits, time of access limits, delivery location(s), pick-up location(s), or other information for use of unmanned aerial vehicle(s) 104 in the geographical area. An unmanned aerial vehicle 104 that is near the geographical area receives the rules signal, and if the unmanned aerial vehicle 104 is going to enter the geographical area, a processor of the unmanned aerial vehicle 104 can determine if the unmanned aerial vehicle 104 will violate one or more of the rules included in the rules signal. If a determination is made that entry of the unmanned aerial vehicle 104 into the geographical area will violate one or more of the rules, the unmanned aerial vehicle 104 may send an access query to a controller associated with the unmanned aerial vehicle 104. Responsive to the access query, the unmanned aerial vehicle 104 may receive instructions to enter the geographical area despite the rules, instructions to avoid the geographical area, or instructions to reorder a tasks list so that entering the geographical area will occur at a later time that will not violate the rules included in the rules signal. In some implementations of the unmanned aerial vehicle 104, the unmanned aerial vehicle 104 will not cross into the geographical area if the unmanned aerial vehicle 104 does not receive an instruction to cross into the geographical from the controller. In other implementations, the unmanned aerial vehicle 104 will cross into the geographical area if the unmanned aerial vehicle 104 does not receive an instruction to avoid the geographical area.

In some implementations, the processor(s) 106 are configured to analyze the sound 128 received by the microphone 122. As detailed above, one or more unmanned aerial vehicle(s) 104 can generate sound 128 associated with the operation of the unmanned aerial vehicle(s) 104. As the unmanned aerial vehicle(s) 104 move within an appropriate distance of the computing device 102, the microphone 122 will pick up some or all of the sound 128. In some aspects, the processor(s) 106 can include one or more sound analyzer(s) 112 configured to analyze the sound 128 picked up by the microphone 122 at a particular time. The sound analyzer 112 can be configured to, among other functions, determine one or more properties of the sound 128 at a particular time and/or range of times (e.g., amplitude, frequency, wavelength, velocity, etc.). In some aspects, the sound analyzer 112 can be configured to generate one or more derived sound property values determined from one or more measured sound property values. For example, the sound analyzer 112 can be configured to generate a set of values tracking the change in amplitude associated with the sound 128 over a period of time.

In some aspects, the processor(s) 106 are configured to analyze the sound 128 via beamforming a plurality of signals from a corresponding plurality of microphones in a microphone array constituting the microphone 122. For example, each of the microphone in the microphone array can have an associated input signal. The sound analyzer 112 can be configured to analyze each signal individually and/or combine some or all of the signals in a beamforming operation for further analysis.

In some implementations, the processor(s) 106 are configured to determine if the sound 128 is associated with the unmanned aerial vehicle 104. For example, the sound analyzer 112 can be configured to execute one or more machine learning models trained to classify groups of measured and/or determined sound properties as originating from particular types of sound sources. A classifier could, for example, identify whether a particular sound 128 is associated with an unmanned aerial vehicle 104, street traffic, high flying aircraft, etc. As an additional example, the sound analyzer 112 can be configured to apply an audio discriminator to data associated with the sound 128. In such a configuration, the sound analyzer 112 can configured to apply a band-pass filter to the sound 128 to determine whether the sound 128 has one or more associated frequencies that are typically associated with the operation of the unmanned aerial vehicle(s) 104.

In some implementations, the processor(s) 106 are configured to, responsive to determining the sound 128 is associated with the unmanned aerial vehicle(s) 104, capture data associated with a location of the unmanned aerial vehicle(s) 104. In some aspects, data associated with the actual and/or estimated location of the unmanned aerial vehicle(s) 104 can be stored as an unmanned aerial vehicle location 120 at the memory 108.

In some aspects, the computing device 102 can include a location analyzer 109 configured to capture and/or analyze data associated with the location of the unmanned aerial vehicle(s) 104. In a particular aspect, the location analyzer 109 can be configured to parse a beacon signal from the unmanned aerial vehicle(s) 104 to capture data associated with a location of the unmanned aerial vehicle(s) 104. For example, if the computing device receives an automatic dependent surveillance broadcast signal from the unmanned aerial vehicle(s) 104, or the controller of the unmanned aerial vehicle(s) 104, the location analyzer 109 can be configured to analyze the received signal to determine the most recent location information associated with the unmanned aerial vehicle(s) 104 (e.g., as GPS coordinates).

In the same or alternative aspects, the location analyzer 109 can capture data associated with the location of the computing device 102 (e.g., current GPS coordinates) referenced to a time stamp of a particular collection of data associated with the sound 128. For example, if the location of the unmanned aerial vehicle(s) 104 cannot be determined from the identification data 130, the location analyzer 109 can be configured to analyze data associated with the sound 128 over a period of time to estimate a distance between the computing device 102 and the unmanned aerial vehicle(s) 104 at a particular time. In some aspects, capturing data associated with a location of the unmanned aerial vehicle(s) 104 can include other data sources. For example, the expected amplitude of the sound 128 generated by a particular unmanned aerial vehicle 104 of a particular make, model, and operator in a particular region may be known. By cross-referencing the identification 118, data regarding expected measured sound properties, and actual measured sound properties, the location analyzer 109 can be configured to estimate, for example, a distance between the computing device 102 and the unmanned aerial vehicle(s) 104.

In some implementations, the processor(s) 106 can be configured to determine if the unmanned aerial vehicle(s) 104 are committing a violation. The violation can include, for example, a noise violation, a location violation, or some combination thereof. Data associated with a violation determination can be stored as violation(s) 116 at the memory 108.

In some aspects, the computing device 102 can include a violation analyzer 110 configured to determine if a particular unmanned aerial vehicle 104 is committing a violation. For example, the violation analyzer 110 can be configured to determine if the unmanned aerial vehicle(s) 104 are committing a violation based at least on whether the location 120 of the unmanned aerial vehicle 104 is within a threshold distance of a location associated with the sound 128. When the computing device 102 receives the sound 128 and analyzes that sound 128, the computing device 102 must still determine whether the sound 128 is associated with a particular unmanned aerial vehicle 104 (e.g., if multiple unmanned aerial vehicles 104 are operating in the same area). If a particular unmanned aerial vehicle 104 is within a threshold distance (e.g., ten feet) of a location associated with the sound 128 (e.g., the current location of the computing device 102), the violation analyzer 110 can be configured to determine that the particular unmanned aerial vehicle 104 committed the violation(s) 116 associated with the sound 128.

In some implementations, data indicative of the threshold distance of a location associated with the sound 128 can be stored as threshold(s) 114 at the memory 108. In some aspects, the threshold(s) 114 can include data indicative of other thresholds associated with the operation of the system 100. For example, the threshold(s) 114 can include sound amplitude threshold(s) associated with a particular type of noise violation(s), location threshold(s) associated with a particular type of location violation(s), etc.

In some implementations, the violation analyzer 110 can be configured to determine whether the unmanned aerial vehicle(s) 104 committed a time-dependent violation. In a particular configuration, a violation may only occur if particular behavior occurs at a particular time (or within a particular range of times). For example, a sound violation may only occur if an amplitude of the sound 128 rises above a sound amplitude threshold for a certain amount of time (e.g., more than one second). As an additional example, a sound violation may only occur if the amplitude of the sound 128 rises above the sound amplitude threshold at any time during the hours of 10:00 p.m. to 6:00 a.m. local time. As a further example, a location violation may only occur if an unmanned aerial vehicle 104 crosses into a no-fly area defined by a governmental entity.

In some implementations, the processor(s) 106 can be configured to send a notification responsive to determining if the unmanned aerial vehicle(s) 104 are committing the violation(s) 116. In some aspects, the notification can be sent to a centralized storage for further processing, a law enforcement notification device, the unmanned aerial vehicle(s) 104, some other appropriate device, or some combination thereof. For example, if a particular unmanned aerial vehicle 104 is determined by the processor(s) 106 to have committed a violation, the processor(s) 106 can communicate the identification 118, the unmanned aerial vehicle location 120, the violation(s) 116, or some combination thereof to a civic law enforcement authority for issuance of a citation to the one or more entities responsible for the operation of the particular unmanned aerial vehicle 104. As an additional example, the processor(s) 106 can communicate the identification 118, the unmanned aerial vehicle location 120, the violation(s) 116, or some combination thereof to the unmanned aerial vehicle 104 for storage and later retrieval.

In some implementations, the computing device 102 can also include a camera 126 coupled to the one or more processors 106. The camera 126 can be configured to capture visual information associated with the unmanned aerial vehicle(s) 104. For example, the camera 126 can be configured to capture video of the unmanned aerial vehicle 104 during the time period associated with receipt of the sound 128 by the computing device 102.

The system 100 can also include components not illustrated in FIG. 1. For example, the computing device 102 can also include a transmitter configured to transmit the data associated with the location 120 of the unmanned aerial vehicle. The transmitter can be configured to transmit the data, for example, via a radio frequency or an infrared frequency. As an additional example, the system 100 can also include one or more input/output interfaces, one or more network interfaces, etc. Further, although FIG. 1 illustrates the memory 108 of the system 100 as storing certain data, more, fewer, and/or different data can be present within the memory 108 without departing from the scope of the subject disclosure.

Additionally, although FIG. 1 illustrates certain operations occurring within the computing device 102, these operations can be performed by other components of the system 100 without departing from the scope of the subject disclosure. For example, one or more databases external to the computing device 102 can be configured to host or otherwise incorporate some or all of the threshold(s) 114, the violation(s) 116, the identification 118, the unmanned aerial vehicle location 120, data defining no-fly zones, or some combination thereof. Such database(s) can be located remotely from the computing device 102 and accessed via the modem 124 of the computing device 102.

Further, although FIG. 1 illustrates the computing device 102 and the unmanned aerial vehicle 104 as separate, other configurations are possible without departing from the scope of the subject disclosure. For example, the computing device 102 can be integrated into the unmanned aerial vehicle 104 (e.g., as a law enforcement-mandated violation monitoring module whose data contents are only accessible to law enforcement). The unmanned aerial vehicle 104 can be flown to a particular location to monitor sounds from other unmanned aerial vehicles at that location. For example, in response to receipt of notifications of multiple violations at a particular location by a law enforcement agency, the law enforcement agency may send the UAV 104 to the particular location to monitor the particular location for further violations. The computing device 102 accounts for noise produced by the unmanned aerial vehicle 104 if the computing device 102 is used while the unmanned aerial vehicle 104 is in flight. As an additional example, one or more components of the computing device 102 can be distributed across a plurality of computing devices (e.g., a group of servers).

Figure 2:
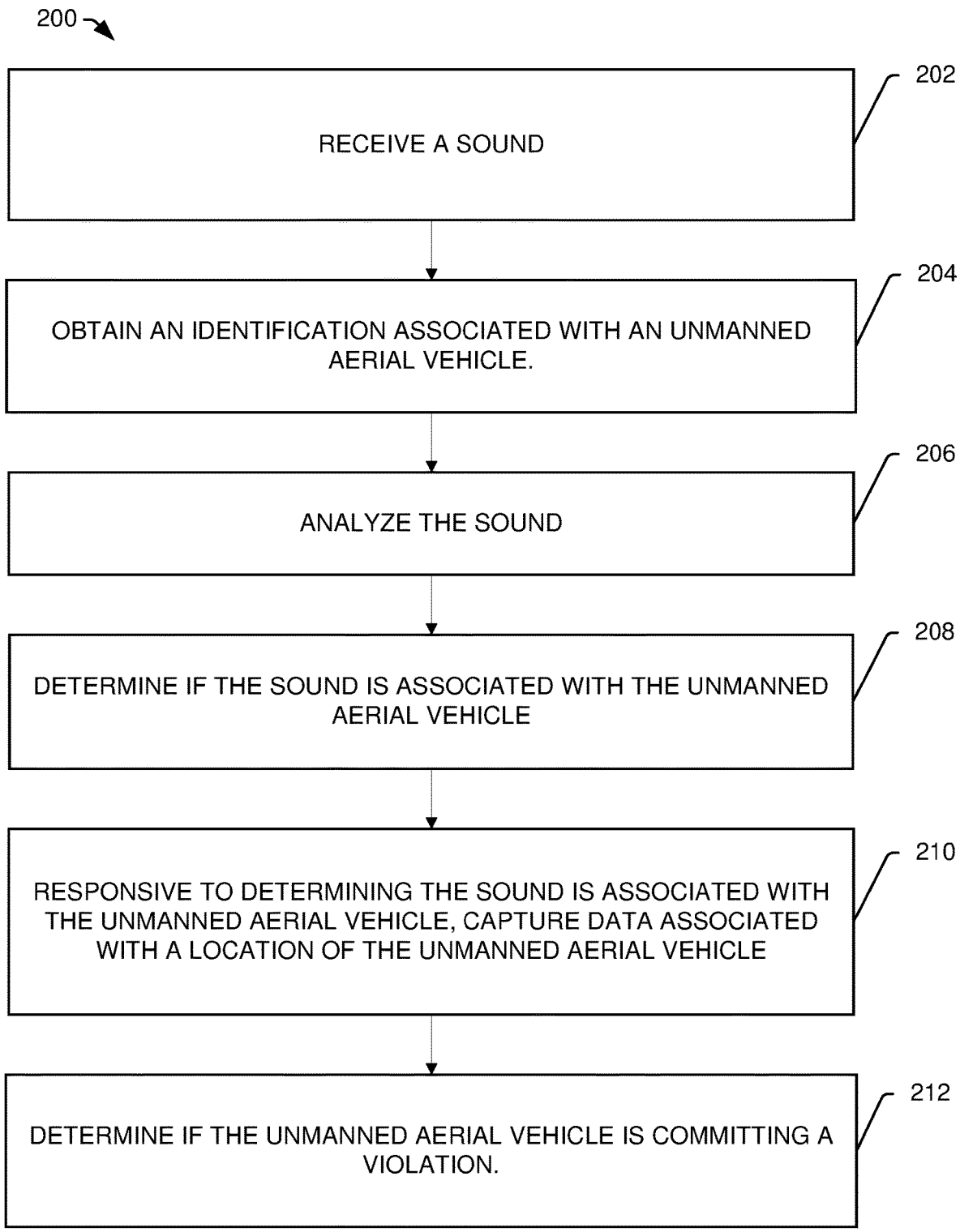
FIG. 2 is a flow chart of an example method for violation detection for unmanned aerial vehicles, in accordance with the subject disclosure.

FIG. 2 is a flow chart of an example method 200 for violation detection for unmanned aerial vehicles, in accordance with the subject disclosure. The method 200 can be initiated, performed, or controlled by one or more processors executing instructions, such as by the processor(s) 106 of FIG. 1 executing instructions from the memory 108.

In some implementations, the method 200 includes, at 202, receiving a sound. For example, the processor(s) 106 of FIG. 1 can receive the sound 128 via the microphone 122. The method 200 can also include, at 204, obtaining an identification associated with an unmanned aerial vehicle. For example, the location analyzer 109 of FIG. 1 can obtain the identification 118 associated with the unmanned aerial vehicle(s) 104.

In the example of FIG. 2, the method 200 can also include, at 206, analyzing the sound. For example, the sound analyzer 112 of FIG. 1 can analyze the sound 128 for various measured and/or determined property values (e.g., frequency, amplitude, etc.) associated with the sound 128.

In the example of FIG. 2, the method 200 can also include, at 208, determining if the sound is associated with the unmanned aerial vehicle. For example, the processor(s) 106 of FIG. 1 can determine if the sound 128 is associated with a particular unmanned aerial vehicle 104.

In the example of FIG. 2, the method 200 can also include, at 210, responsive to determining the sound is associated with the unmanned aerial vehicle, capturing data associated with a location of the unmanned aerial vehicle. For example, the location analyzer 109 of FIG. 1 can, responsive to the sound analyzer 112 determining the sound is associated with the unmanned aerial vehicle 104, capture data associated with a location 120 of the unmanned aerial vehicle 104.

In the example of FIG. 2, the method 200 can also include, at 212, determining if the unmanned aerial vehicle is committing a violation. For example, the violation analyzer 110 of FIG. 1 can determine if the particular unmanned aerial vehicle 104 committed the violation(s) 116.

Although the method 200 is illustrated as including a certain number of steps, more, fewer, and/or different steps can be included in the method 200 without departing from the scope of the subject disclosure. For example, the method 200 can vary depending on the count and variety of sounds received at a particular time, as described in more detail above with reference to FIG. 1. For example, the method 200 can obtain identification associated with a plurality of unmanned aerial vehicles prior to, simultaneously with, or after analyzing a plurality of sounds.

Figure 3:
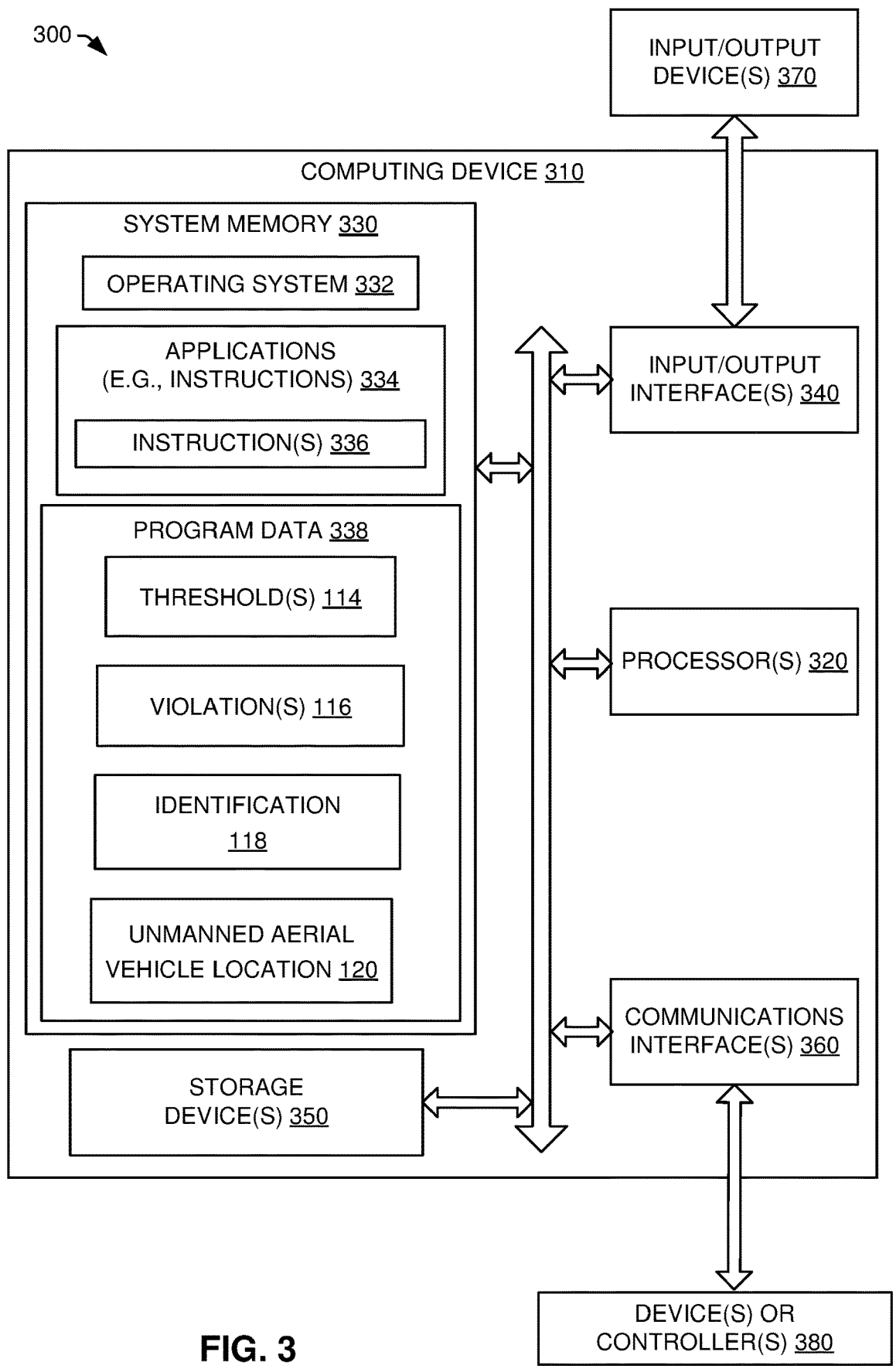
FIG. 3 is a block diagram of a computing environment including a computing device configured to support aspects of computer-implemented methods and computer-executable program instructions (or code) according to the subject disclosure.

FIG. 3 is a block diagram of a computing environment 300 including a computing device 310 configured to support aspects of computer-implemented methods and computer-executable program instructions (or code) according to the subject disclosure. For example, the computing device 310, or portions thereof, is configured to execute instructions to initiate, perform, or control one or more operations described in more detail above with reference to FIG. 1 and FIG. 2. In a particular aspect, the computing device 310 can include the computing device 102 and/or the unmanned aerial vehicle 104 of FIG. 1, one or more servers, one or more virtual devices, or a combination thereof.

The computing device 310 includes one or more processors 320. In a particular aspect, the processor(s) 320 correspond to the processor(s) 106 of FIG. 1. The processor(s) 320 are configured to communicate with system memory 330, one or more storage devices 350, one or more input/output interfaces 340, one or more communications interfaces 360, or any combination thereof. The system memory 330 includes volatile memory devices (e.g., random access memory (RAM) devices), nonvolatile memory devices (e.g., read-only memory (ROM) devices, programmable read-only memory, and flash memory), or both. The system memory 330 stores an operating system 332, which can include a basic input/output system for booting the computing device 310 as well as a full operating system to enable the computing device 310 to interact with users, other programs, and other devices. The system memory 330 stores system (program) data 338, such as the instructions 336, the threshold(s) 114, the violation(s) 116, the identification 118, the unmanned aerial vehicle location 120 of FIG. 1, or a combination thereof.

The system memory 330 includes one or more applications 334 (e.g., sets of instructions) executable by the processor(s) 320. As an example, the one or more applications 334 include the instructions 336 executable by the processor(s) 320 to initiate, control, or perform one or more operations described with reference to FIG. 1 and FIG. 2. To illustrate, the one or more applications 334 include the instructions 336 executable by the processor(s) 320 to initiate, control, or perform one or more operations described with reference to obtaining the identification 118 associated with the unmanned aerial vehicle 104, analyzing the sound 128 received by the microphone 122, determining if the sound 128 is associated with the unmanned aerial vehicle 104, capturing data associated with the location 120 of the unmanned aerial vehicle, determining if the unmanned aerial vehicle is committing the violation(s) 116 of FIG. 1, or a combination thereof.

In a particular implementation, the system memory 330 includes a non-transitory, computer readable medium (e.g., a computer-readable storage device) storing the instructions 336 that, when executed by the processor(s) 320, cause the processor(s) 320 to initiate, perform, or control operations for improving an automated environment for aeronautical information services. The operations include obtaining an identification associated with an unmanned aerial vehicle. The operations also include analyzing a sound received by a microphone. The operations also include determining if the sound is associated with the unmanned aerial vehicle. The operations also include, responsive to determining the sound is associated with the unmanned aerial vehicle, capturing data associated with a location of the unmanned aerial vehicle. The operations also include determining if the unmanned aerial vehicle is committing a violation.

The one or more storage devices 350 include nonvolatile storage devices, such as magnetic disks, optical disks, or flash memory devices. In a particular example, the storage devices 350 include both removable and non-removable memory devices. The storage devices 350 are configured to store an operating system, images of operating systems, applications (e.g., one or more of the applications 334), and program data (e.g., the program data 338). In a particular aspect, the system memory 330, the storage devices 350, or both, include tangible computer-readable media. In a particular aspect, one or more of the storage devices 350 are external to the computing device 310.

The one or more input/output interfaces 340 enable the computing device 310 to communicate with one or more input/output devices 370 to facilitate user interaction. For example, the one or more input/output interfaces 340 can include a display interface, an input interface, or both. For example, the input/output interface 340 is adapted to receive input from a user, to receive input from another computing device, or a combination thereof. In some implementations, the input/output interface 340 conforms to one or more standard interface protocols, including serial interfaces (e.g., universal serial bus (USB) interfaces or Institute of Electrical and Electronics Engineers (IEEE) interface standards), parallel interfaces, display adapters, audio adapters, or custom interfaces ("IEEE" is a registered trademark of The Institute of Electrical and Electronics Engineers, Inc. of Piscataway, New Jersey). In some implementations, the input/output device(s) 370 include one or more user interface devices and displays, including some combination of buttons, keyboards, pointing devices, displays, speakers, microphones, touch screens, and other devices.

The processor(s) 320 are configured to communicate with devices or controllers 380 via the one or more communications interfaces 360. For example, the one or more communications interfaces 360 can include a network interface. As an additional example, the one or more communications interfaces 360 can include the modem 124 of FIG. 1. The devices or controllers 380 can include, for example, the unmanned aerial vehicle(s) 104 of FIG. 1.

In some implementations, a non-transitory, computer readable medium (e.g., a computer-readable storage device) stores instructions that, when executed by one or more processors, cause the one or more processors to initiate, perform, or control operations to perform part of or all the functionality described above. For example, the instructions can be executable to implement one or more of the operations or methods of FIG. 1 and FIG. 2. In some implementations, part or all of one or more of the operations or methods of FIG. 1 and FIG. 2 can be implemented by one or more processors (e.g., one or more central processing units (CPUs), one or more graphics processing units (GPUs), one or more digital signal processors (DSPs)) executing instructions, by dedicated hardware circuitry, or any combination thereof.

The illustrations of the examples described herein are intended to provide a general understanding of the structure of the various implementations. The illustrations are not intended to serve as a complete description of all of the elements and features of apparatus and systems that utilize the structures or methods described herein. Many other implementations can be apparent to those of skill in the art upon reviewing the disclosure. Other implementations can be utilized and derived from the disclosure, such that structural and logical substitutions and changes can be made without departing from the scope of the disclosure. For example, method operations can be performed in a different order than shown in the figures or one or more method operations can be omitted. Accordingly, the disclosure and the figures are to be regarded as illustrative rather than restrictive.

Moreover, although specific examples have been illustrated and described herein, it should be appreciated that any subsequent arrangement designed to achieve the same or similar results can be substituted for the specific implementations shown. This disclosure is intended to cover any and all subsequent adaptations or variations of various implementations. Combinations of the above implementations, and other implementations not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features can be grouped together or described in a single implementation for the purpose of streamlining the disclosure. Examples described above illustrate but do not limit the disclosure. It should also be understood that numerous modifications and variations are possible in accordance with the principles of the subject disclosure. As the following claims reflect, the claimed subject matter can be directed to less than all of the features of any of the disclosed examples. Accordingly, the scope of the disclosure is defined by the following claims and their equivalents.

Further, the disclosure comprises embodiments according to the following clauses:

According to Clause 1, a device includes a microphone, a memory configured to store instructions, and one or more processors coupled to the microphone and coupled to the memory. The one or more processors are configured to obtain an identification associated with an unmanned aerial vehicle. The one or more processors are also configured to analyze a sound received by the microphone. The one or more processors are also configured to determine if the sound is associated with the unmanned aerial vehicle. The one or more processors are also configured to, responsive to determining the sound is associated with the unmanned aerial vehicle, capture data associated with a location of the unmanned aerial vehicle. The one or more processors are also configured to determine if the unmanned aerial vehicle is committing a violation.

Clause 2 includes the device of Clause 1, wherein the violation includes a noise violation.

Clause 3 includes the device of Clause 1 or Clause 2, wherein the violation includes a location violation.

Clause 4 includes the device of any of Clauses 1-3, wherein the device further includes a transmitter coupled to the one or more processors. The transmitter is configured to transmit the data associated with the location of the unmanned aerial vehicle.

Clause 5 includes the device of Clause 4, wherein the transmitter is configured to transmit the data via a radio frequency or an infrared frequency.

Clause 6 includes the device of any of Clauses 1-5, wherein the one or more processors are further configured to determine if the unmanned aerial vehicle is committing the violation based at least on whether the location of the unmanned aerial vehicle is within a threshold distance of a location associated with the sound.

Clause 7 includes the device of any of Clauses 1-6, wherein the device further includes a camera coupled to the one or more processors, the camera configured to capture video of the unmanned aerial vehicle.

Clause 8 includes the device of any of Clauses 1-7, wherein the one or more processors are further configured to send a notification responsive to determining if the unmanned aerial vehicle is committing the violation.

Clause 9 includes the device of any of Clauses 1-8, wherein the one or more processors are further configured to determine if the sound is associated with the unmanned aerial vehicle via one or more machine learning models.

Clause 10 includes the device of any of Clauses 1-9, wherein the one or more processors are further configured to determine if the sound is associated with the unmanned aerial vehicle via an audio discriminator.

Clause 11 includes the device of any of Clauses 1-10, wherein the violation is a time-dependent violation.

Clause 12 includes the device of any of Clauses 1-11, wherein the identification includes an automatic dependent surveillance-broadcast signal.

Clause 13 includes the device of any of Clauses 1-12, wherein the identification includes an internet-based identification.

Clause 14 includes the device of any of Clauses 1-13, wherein the microphone includes a microphone array.

Clause 15 includes the device of Clause 14, wherein the one or more processors are further configured to analyze the sound via beamforming a plurality of signals from a corresponding plurality of microphones in the microphone array.

According to Clause 16, a non-transient, computer-readable medium stores instructions that, when executed by one or more processors, cause the one or more processors to initiate, perform, or control operations including obtaining an identification associated with an unmanned aerial vehicle. The operations also include analyzing a sound received by a microphone. The operations also include determining if the sound is associated with the unmanned aerial vehicle. The operations also include, responsive to determining the sound is associated with the unmanned aerial vehicle, capturing data associated with a location of the unmanned aerial vehicle. The operations also include determining if the unmanned aerial vehicle is committing a violation.

Clause 17 includes the non-transient, computer-readable medium of Clause 16, wherein the violation includes a noise violation.

Clause 18 includes the non-transient, computer-readable medium of Clause 16 or Clause 17, wherein the violation includes a location violation.

Clause 19 includes the non-transient, computer-readable medium of any of Clauses 16-18, wherein the operations further include transmitting the data associated with the location of the unmanned aerial vehicle.

Clause 20 includes the non-transient, computer-readable medium of Clause 19, wherein transmitting the data includes transmitting the data via a radio frequency or an infrared frequency.

Clause 21 includes the non-transient, computer-readable medium of any of Clauses 16-20, wherein the operations further include determining if the unmanned aerial vehicle is committing the violation based at least on whether the location of the unmanned aerial vehicle is within a threshold distance of a location associated with the sound.

Clause 22 includes the non-transient, computer-readable medium of any of Clauses 16-21, wherein the operations further include capturing video of the unmanned aerial vehicle.

Clause 23 includes the non-transient, computer-readable medium of any of Clauses 16-22, wherein the operations further include sending a notification responsive to determining if the unmanned aerial vehicle is committing the violation.

Clause 24 includes the non-transient, computer-readable medium of any of Clauses 16-23, wherein the operations further include determining if the sound is associated with the unmanned aerial vehicle via one or more machine learning models.

Clause 25 includes the non-transient, computer-readable medium of any of Clauses 16-24, wherein the operations further include determining if the sound is associated with the unmanned aerial vehicle via an audio discriminator.

Clause 26 includes the non-transient, computer-readable medium of any of Clauses 16-25, wherein the violation is a time-dependent violation.

Clause 27 includes the non-transient, computer-readable medium of any of Clauses 16-26, wherein the identification includes an automatic dependent surveillance-broadcast signal.

Clause 28 includes the non-transient, computer-readable medium of any of Clauses 16-27, wherein the identification includes an internet-based identification.

Clause 29 includes the non-transient, computer-readable medium of any of Clauses 16-28, wherein the operations further include analyzing the sound via beamforming a plurality of signals from a corresponding plurality of microphones in a microphone array.

According to Clause 30, a device includes means for receiving a sound. The device also includes means for obtaining an identification associated with an unmanned aerial vehicle. The device also includes means for analyzing the sound. The device also includes means for determining if the sound is associated with the unmanned aerial vehicle. The device also includes means for, responsive to determining the sound is associated with the unmanned aerial vehicle, capturing data associated with a location of the unmanned aerial vehicle. The device also includes means for determining if the unmanned aerial vehicle is committing a violation.

Clause 31 includes the device of Clause 30, wherein the violation includes a noise violation.

Clause 32 includes the device of Clause 30 or Clause 31, wherein the violation includes a location violation.

Clause 33 includes the device of Clause any of Clauses 30-32, wherein the device further includes means for transmitting the data associated with the location of the unmanned aerial vehicle.

Clause 34 includes the device of Clause 33, wherein the means for transmitting the data includes means for transmitting the data via a radio frequency or an infrared frequency.

Clause 35 includes the device of any of Clauses 30-34, wherein the device further includes means for determining if the unmanned aerial vehicle is committing the violation based at least on whether the location of the unmanned aerial vehicle is within a threshold distance of a location associated with the sound.

Clause 36 includes the device of any of Clauses 30-35, wherein the device further includes means for capturing video of the unmanned aerial vehicle.

Clause 37 includes the device of any of Clauses 30-36, wherein the device further includes means for sending a notification responsive to determining if the unmanned aerial vehicle is committing the violation.

Clause 38 includes the device of any of Clauses 30-37, wherein the device further includes means for determining if the sound is associated with the unmanned aerial vehicle via one or more machine learning models.

Clause 39 includes the device of any of Clauses 30-38, wherein the device further includes means for determining if the sound is associated with the unmanned aerial vehicle via an audio discriminator.

Clause 40 includes the device of any of Clauses 30-39, wherein the violation is a time-dependent violation.

Clause 41 includes the device of any of Clauses 30-40, wherein the identification includes an automatic dependent surveillance-broadcast signal.

Clause 42 includes the device of any of Clauses 30-41, wherein the identification includes an internet-based identification.

Clause 43 includes the device of any of Clauses 30-42, wherein the device further includes means for analyzing the sound via beamforming a plurality of signals from a corresponding plurality of microphones in a microphone array.

Clause 44 includes a method that includes receiving a sound. The method also includes obtaining an identification associated with an unmanned aerial vehicle. The method also includes analyzing the sound. The method also includes determining if the sound is associated with the unmanned aerial vehicle. The method also includes, responsive to determining the sound is associated with the unmanned aerial vehicle, capturing data associated with a location of the unmanned aerial vehicle. The method also includes determining if the unmanned aerial vehicle is committing a violation.

Clause 45 includes the method of Clause 44, wherein the violation includes a noise violation.

Clause 46 includes the method of Clause 44 or Clause 45, wherein the violation includes a location violation.

Clause 47 includes the method of any of Clauses 44-46, wherein the method also includes transmitting the data associated with the location of the unmanned aerial vehicle.

Clause 48 includes the method of Clause 47, wherein transmitting the data includes transmitting the data via a radio frequency or an infrared frequency.

Clause 49 includes the method of any of Clauses 44-48, wherein the method further includes determining if the unmanned aerial vehicle is committing the violation based at least on whether the location of the unmanned aerial vehicle is within a threshold distance of a location associated with the sound.

Clause 50 includes the method of any of Clauses 44-49, wherein the method further includes capturing video of the unmanned aerial vehicle.

Clause 51 includes the method of any of Clauses 44-50, wherein the method further includes sending a notification responsive to determining if the unmanned aerial vehicle is committing the violation.

Clause 52 includes the method of any of Clauses 44-51, wherein the method further includes determining if the sound is associated with the unmanned aerial vehicle via one or more machine learning models.

Clause 53 includes the method of any of Clauses 44-52, wherein the method further includes determining if the sound is associated with the unmanned aerial vehicle via an audio discriminator.

Clause 54 includes the method of any of Clauses 44-53, wherein the violation is a time-dependent violation.

Clause 55 includes the method of any of Clauses 44-54, wherein the identification includes an automatic dependent surveillance-broadcast signal.

Clause 56 includes the method of any of Clauses 44-55, wherein the identification includes an internet-based identification.

Clause 57 includes the method of any of Clauses 44-56, wherein the method further includes analyzing the sound via beamforming a plurality of signals from a corresponding plurality of microphones in a microphone array.

What is claimed is:

1. A device comprising:
 a microphone;
 a memory configured to store instructions; and
 one or more processors coupled to the microphone and coupled to the memory, the one or more processors configured to:
  obtain an identification associated with an unmanned aerial vehicle;
  analyze a sound received by the microphone;
  determine an association between the sound and the unmanned aerial vehicle based on a comparison of characteristics of the sound with sound characteristic associated with the obtained identification of the unmanned aerial vehicle;
  responsive to the determination that the sound is associated with the unmanned aerial vehicle, capture location data associated with a location of the unmanned aerial vehicle; and
  determine a violation status of the unmanned aerial vehicle based on the captured location data.

2. The device of claim 1, wherein the violation status is indicative of a noise violation.

3. The device of claim 1, wherein the violation status is indicative of a location violation.

4. The device of claim 1, further comprising a transmitter configured to transmit the location data associated with the location of the unmanned aerial vehicle.

5. The device of claim 4, wherein the transmitter is configured to transmit the location data via a radio frequency or an infrared frequency.

6. The device of claim 1, wherein the determination of the violation status of the unmanned aerial vehicle causes the one or more processors to be further configured to determine that the unmanned aerial vehicle is in violation when the location of the unmanned aerial vehicle is within a threshold distance of a location associated with the sound.

7. The device of claim 1, further comprising a camera coupled to the one or more processors, the camera configured to capture video of the unmanned aerial vehicle.

8. The device of claim 1, wherein the one or more processors are further configured to send a notification responsive to the determination of the violation status of the unmanned aerial vehicle.

9. The device of claim 1, wherein the determination of the association between the sound and the unmanned aerial vehicle utilizes one or more machine learning models.

10. The device of claim 1, wherein the determination of the association between the sound and the unmanned aerial vehicle utilizes an audio discriminator.

11. The device of claim 1, wherein the violation status is indicative of a time-dependent violation.

12. The device of claim 1, wherein the identification comprises an automatic dependent surveillance-broadcast signal.

13. The device of claim 1, wherein the identification comprises an internet-based identification.

14. The device of claim 1, wherein the microphone a microphone array.

15. The device of claim 14, wherein the one or more processors are configured to analyze the sound via beamforming a plurality of signals from a corresponding plurality of microphones in the microphone array.

16. A non-transitory computer-readable medium comprising instructions that, when executed by one or more processors, cause the one or more processors to:

obtain an identification associated with an unmanned aerial vehicle;

analyze a sound received by a microphone;

determine an association between the sound and the unmanned aerial vehicle based on a comparison of characteristics of the sound with sound characteristic associated with the obtained identification of the unmanned aerial vehicle;

responsive to the determination that the sound is associated with the unmanned aerial vehicle, capture location data associated with a location of the unmanned aerial vehicle; and determine a violation status of the unmanned aerial vehicle based on the captured location data.

17. The non-transitory computer-readable medium of claim 16, wherein the violation status is indicative of a noise violation.

18. The non-transitory computer-readable medium of claim 16, wherein the violation status is indicative of a location violation.

19. A method comprising:

receiving a sound;

obtaining an identification associated with an unmanned aerial vehicle;

analyzing the sound;

determining an association between the sound and the unmanned aerial vehicle based on comparing characteristics of the sound with sound characteristic associated with the obtained identification of the unmanned aerial vehicle;

responsive to determining the sound is associated with the unmanned aerial vehicle, capturing location data associated with a location of the unmanned aerial vehicle; and determining a violation status of the unmanned aerial vehicle based on the captured location data.

20. The method of claim 19, further comprising transmitting the location data associated with the location of the unmanned aerial vehicle.

* * * * *

UNITED STATES PATENT AND TRADEMARK OFFICE
CERTIFICATE OF CORRECTION

PATENT NO. : 12,323,778 B2
APPLICATION NO. : 18/153474
DATED : June 3, 2025
INVENTOR(S) : Rajat Agrawal and Athanasios N. Apostolopoulos Page 1 of 1

It is certified that error appears in the above-identified patent and that said Letters Patent is hereby corrected as shown below:

In the Claims

Column 17, Line 25. Claim 14 after "microphone" insert --comprises--.

Signed and Sealed this
Twelfth Day of August, 2025

Coke Morgan Stewart
*Acting Director of the United States Patent and Trademark Office*